United States Patent
Chang et al.

(10) Patent No.: US 9,971,515 B2
(45) Date of Patent: May 15, 2018

(54) INCREMENTAL BACKGROUND MEDIA SCAN

(71) Applicant: Western Digital Technologies, Inc., Irvine, CA (US)

(72) Inventors: Hung-Min Chang, Irvine, CA (US); Haining Liu, Irvine, CA (US); Yuriy Pavlenko, Mission Viejo, CA (US); Hung-Cheng Yeh, Irvine, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 136 days.

(21) Appl. No.: 15/264,391

(22) Filed: Sep. 13, 2016

(65) Prior Publication Data
US 2018/0074701 A1   Mar. 15, 2018

(51) Int. Cl.
*G06F 3/06* (2006.01)

(52) U.S. Cl.
CPC ............ *G06F 3/061* (2013.01); *G06F 3/0655* (2013.01); *G06F 3/0688* (2013.01)

(58) Field of Classification Search
CPC ....... G06F 3/061; G06F 3/0655; G06F 3/0688
See application file for complete search history.

(56) References Cited

U.S. PATENT DOCUMENTS

| | | |
|---|---|---|
| 7,477,547 B2 | 1/2009 | Lin |
| 8,656,086 B2 | 2/2014 | Zimmermann et al. |
| 8,914,696 B2 | 12/2014 | Chen et al. |
| 9,165,668 B1 | 10/2015 | Zhao et al. |
| 2008/0059835 A1* | 3/2008 | Yoon .................... G11C 11/5628 714/6.12 |
| 2009/0327581 A1 | 12/2009 | Coulson |
| 2011/0119431 A1* | 5/2011 | Chowdhury ....... G11C 16/3418 711/103 |
| 2013/0173972 A1 | 7/2013 | Kubo |

(Continued)

OTHER PUBLICATIONS

Awasthi et al., "Efficient Scrub Mechanisms for Error-Prone Emerging Memories", IEEE 2011, 12 pgs. Applicant points out, in accordance with MPEP 609.04(a), that the year of publication, 2011, is sufficiently earlier than the effective U.S. filing date, Sep. 13, 2016, so that the particular month of publication is not in issue.

(Continued)

*Primary Examiner* — Ryan Bertram
(74) *Attorney, Agent, or Firm* — Foley & Lardner LLP

(57) ABSTRACT

In general, a storage device may perform an incremental background media scan. The storage device includes a data storage portion comprising a plurality of blocks. The storage device also includes a controller configured to perform the scan to determine whether to perform maintenance on the page. As such, the controller may scan a first page of a first block of a set of blocks. Each block has multiple pages. The controller may, for each respective remaining block of the set, scan a respective first page of the respective remaining block, the first page having a same first index as the respective first page. The controller may further scan a second page of the first block. The controller may then, for each respective remaining block of the set, scan a respective second page of the respective remaining block, the second page having a same second index as the respective second page.

20 Claims, 6 Drawing Sheets

(56) References Cited

U.S. PATENT DOCUMENTS

| | | |
|---|---|---|
| 2013/0254467 A1 | 9/2013 | Parizi et al. |
| 2016/0034194 A1 | 2/2016 | Brokhman et al. |
| 2016/0179613 A1* | 6/2016 | Suto .................... G06F 11/1048 714/773 |
| 2017/0206131 A1* | 7/2017 | Christensen ........ G06F 11/1072 |
| 2017/0277472 A1* | 9/2017 | Huang .................. G06F 3/0647 |

OTHER PUBLICATIONS

Awasthi et al., "Efficient scrub mechanisms for error-prone emerging memories", HPCA, 2012 IEEE 18th Internationsal Symposium, Feb. 25-29, 2012, 1 pg., Abstract Only Provided.

Ryu et al., "Effects of Data Scrubbing on Reliability in Storage Systems", IEICE Transactions on Information and Systems, vol. E92-D, No. 9, Sep. 1, 2009, 1 pg., Abstract Only Provided.

\* cited by examiner

INCREMENTAL BACKGROUND MEDIA SCAN

TECHNICAL FIELD

The disclosure relates to data storage management.

BACKGROUND

Solid-state drives (SSDs) may be used in computers in applications where relatively low latency and high capacity storage are desired. SSDs may utilize multiple, parallel data channels to read from and write to memory devices, which may result in high sequential read and write speeds.

SSDs may utilize non-volatile memory (NVM) devices, such as flash memory, phase change memory (PCM), resistive random access memory (ReRAM), magnetoresistive random access memory (MRAM) devices, or the like. In some examples, each memory device includes multiple memory cells arranged in blocks, and each block includes multiple pages. In order to improve data retention, a controller in the SSD may perform a background media scan (BGMS) process that periodically reads data from the blocks. As such, the controller can either relocate data stored in the block or page to another block or page to refresh the data, or the controller can monitor a bit error rate (BER) of a page or block to determine whether the page or block is decaying. The BGMS workload has increased with an increase in SSD size, as more data must be scanned in the same amount of time to prevent data decay. To handle the increased workload, the BGMS process utilizes more processing resources in the SSD, which may decrease the overall performance of the SSD.

SUMMARY

In one example, the disclosure is directed to a method that includes scanning, by a controller, a first page of a first block of a set of blocks in a storage device to determine whether to perform maintenance on the first page. The storage device comprises a plurality of blocks, the plurality of blocks includes the set of blocks, and each respective block of the set of blocks comprises a plurality of pages. The method further includes, in response to determining to perform maintenance on the first page of the first block, writing, by the controller, data previously stored in the first page of the first block to a recovery page. The recovery page comprises a page in a block in the set of blocks different than the first page. The method further includes, for each respective remaining block of the set of blocks, scanning, by the controller, a respective first page of the respective remaining block to determine whether to perform maintenance on the respective first page. The first page of the first block has a same first index value as the respective first page. The method also includes scanning, by the controller, a second page of the first block to determine whether to perform maintenance on the second page. The method further includes, for each respective remaining block of the set of blocks, scanning, by the controller, a respective second page of the respective remaining block to determine whether to perform maintenance on the respective second page. The second page of the first block has a same second index value as the respective second page.

In another example, the disclosure is directed to a storage device that includes a data storage portion comprising a plurality of blocks. The storage device also includes a controller configured to scan a first page of a first block of a set of blocks in a storage device to determine whether to perform maintenance on the first page. The plurality of blocks includes the set of blocks, and each respective block of the set of blocks comprises a plurality of pages. The controller is further configured to, in response to determining to perform maintenance on the first page of the first block, write data previously stored in the first page of the first block to a recovery page. The recovery page comprises a page in a block in the set of blocks different than the first page. The controller is further configured to, for each respective remaining block of the set of blocks, scan a respective first page of the respective remaining block to determine whether to perform maintenance on the respective first page. The first page of the first block has a same first index value as the respective first page. The controller is also configured to scan a second page of the first block to determine whether to perform maintenance on the second page. The controller is further configured to, for each respective remaining block of the set of blocks, scan a respective second page of the respective remaining block to determine whether to perform maintenance on the respective second page. The second page of the first block has a same second index value as the respective second page.

In another example, the disclosure is directed to a computer-readable medium storing instructions that, when executed, cause a processor to scan a first page of a first block of a set of blocks in a storage device to determine whether to perform maintenance on the first page. The storage device comprises a plurality of blocks, the plurality of blocks includes the set of blocks, and each respective block of the set of blocks comprises a plurality of pages. The instructions further cause the processor to, in response to determining to perform maintenance on the first page of the first block, write data previously stored in the first page of the first block to a recovery page. The recovery page comprises a page in a block in the set of blocks different than the first page. The instructions further cause the processor to, for each respective remaining block of the set of blocks, scan a respective first page of the respective remaining block to determine whether to perform maintenance on the respective first page. The first page of the first block has a same first index value as the respective first page. The instructions also cause the processor to scan a second page of the first block to determine whether to perform maintenance on the second page. The instructions further cause the processor to, for each respective remaining block of the set of blocks, scan a respective second page of the respective remaining block to determine whether to perform maintenance on the respective second page. The second page of the first block has a same second index value as the respective second page.

The details of one or more examples of the disclosure are set forth in the accompanying drawings and the description below. Other features, objects, and advantages of the disclosure will be apparent from the description and drawings, and from the claims.

DETAILED DESCRIPTION

The disclosure describes techniques for performing an incremental background media scan (BGMS) for a storage device, such as a solid state drive (SSD), which may help increase the operating efficiency of the storage device during the BGMS. A storage device may include a data storage portion and a controller. The data storage portion may include a plurality of blocks, and each respective block may include a plurality of pages. Each respective page of the plurality of pages of each respective block may be assigned a respective index value, e.g., 0 to 255 in an example in which a respective block includes 256 pages. The controller may scan a first page of a first block in a set of blocks included in the plurality of blocks to determine whether to perform maintenance on the first page. Before scanning a second page in the first block, the controller may then continue to scan a respective page in each remaining block from the set of blocks that has the same index value as the first page in the first block. After the single page in each block in the set of blocks is scanned, the controller may then repeat the process for a second index value (i.e., scan a second page in the first block, then scan a corresponding page in each remaining block). For example, for a storage device that has N NAND blocks, the controller may scan page 0 of each NAND block first, then page 1 of each NAND block, then page 2 of each NAND block, and so on, until the controller has scanned each page. In other instances, a patterned scan may be used (e.g., the controller may scan page 0 of each NAND block first, then page 255 of each NAND block, then page 128 of each NAND block, and so on, until the controller has scanned each page).

Rather than scanning every page in a single block before proceeding to scan a second block, the techniques described herein include an alternative scanning pattern that transitions between blocks on the page level. The techniques described herein enable the scanning of a block to be amortized over the planned scanning period, so that the block may be visited multiple times during the planned scanning period. By amortizing the workload in such a way, the potential read performance decrease due to die-collision (i.e., the controller attempting to scan one block of data while simultaneously reading data from or writing data to the same block of data) may be reduced. Further, since the controller scans each block multiple times during the BGMS period, the chance of detecting on-going degradation on a particular block is increased, meaning that the storage device may more reliably store the data for an extended period of time.

Figure 1:
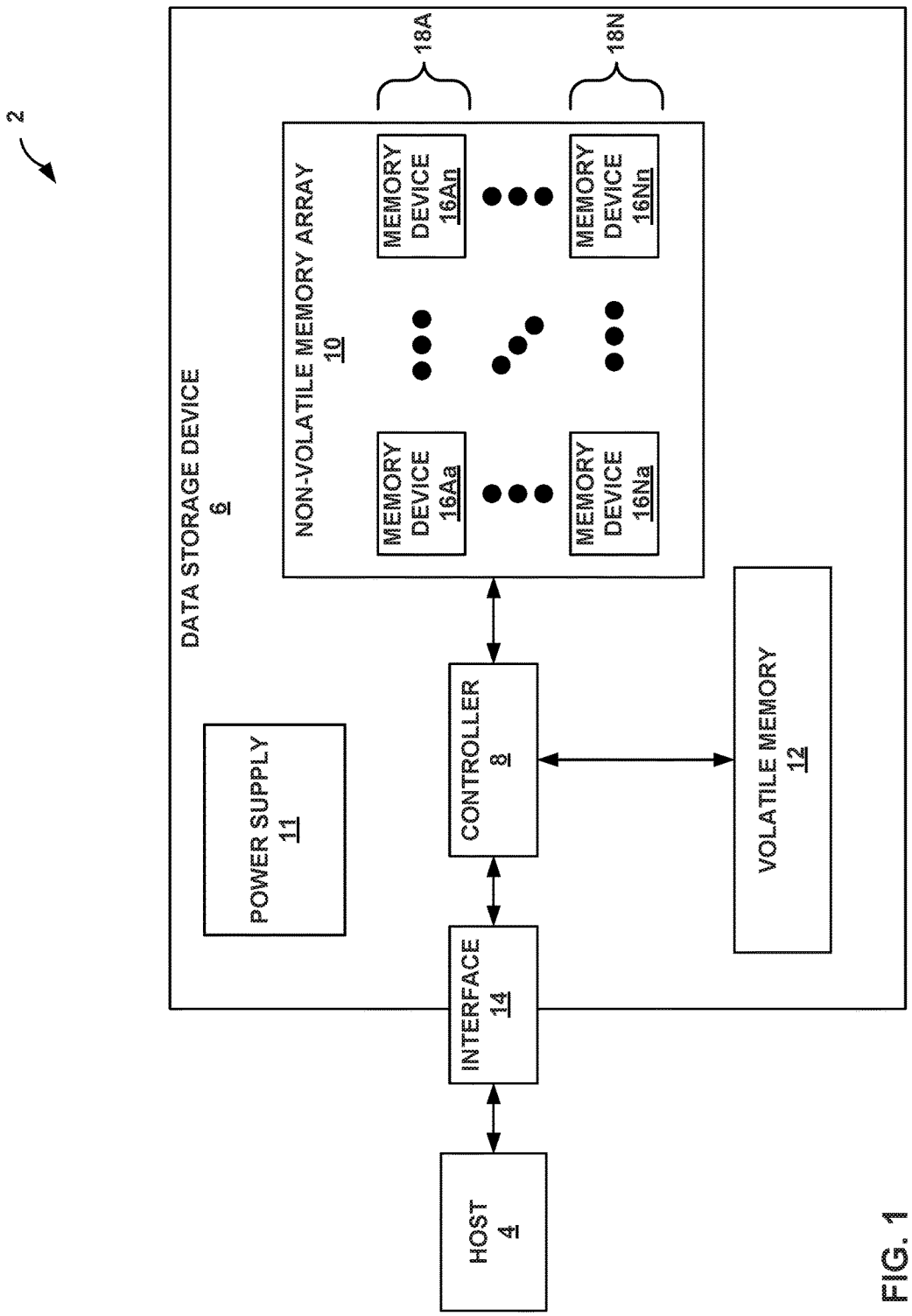
FIG. 1 is a conceptual and schematic block diagram illustrating an example system including a storage device connected to a host device, where the storage device is configured to perform an incremental BGMS in accordance with one or more techniques of this disclosure.

FIG. 1 is a conceptual and schematic block diagram illustrating an example system 2 including storage device 6 connected to host device 4, where storage device 6 is configured to perform an incremental BGMS in accordance with one or more techniques of this disclosure. For instance, host device 4 may utilize non-volatile memory devices included in storage device 6 to store and retrieve data. In some examples, storage environment 2 may include a plurality of storage devices, such as storage device 6, which may operate as a storage array. For instance, storage environment 2 may include a plurality of storages devices 6 configured as a redundant array of inexpensive/independent disks (RAID) that collectively function as a mass storage device for host device 4.

Storage environment 2 may include host device 4 which may store data to and/or retrieve data from one or more storage devices, such as storage device 6. As illustrated in FIG. 1, host device 4 may communicate with storage device 6 via interface 14. Host device 4 may include any of a wide range of devices, including computer servers, network attached storage (NAS) units, desktop computers, notebook (i.e., laptop) computers, tablet computers, set-top boxes, telephone handsets such as so-called "smart" phones, tablet computers, televisions, cameras, display devices, digital media players, video gaming consoles, video streaming device, and the like.

As illustrated in FIG. 1, storage device 6 may include controller 8, non-volatile memory array 10 (NVMA 10), power supply 11, volatile memory 12, and interface 14. In some examples, storage device 6 may include additional components not shown in FIG. 1 for sake of clarity. For example, storage device 6 may include a printed board (PB) to which components of storage device 6 are mechanically attached and which includes electrically conductive traces that electrically interconnect components of storage device 6, or the like. In some examples, the physical dimensions and connector configurations of storage device 6 may conform to one or more standard form factors. Some example standard form factors include, but are not limited to, 3.5" hard disk drive (HDD) or SSD, 2.5" HDD or SSD, 1.8" HDD or SSD, peripheral component interconnect (PCI), PCI-extended (PCI-X), PCI Express (PCIe) (e.g., PCIe x1, x4, x8, x16, PCIe Mini Card, MiniPCI, etc.), M.2, or the like. In some examples, storage device 6 may be directly coupled (e.g., directly soldered) to a motherboard of host device 4.

Storage device 6 may include interface 14 for interfacing with host device 4. Interface 14 may include one or both of a data bus for exchanging data with host device 4 and a control bus for exchanging commands with host device 4. Interface 14 may operate in accordance with any suitable protocol. For example, interface 14 may operate in accordance with one or more of the following protocols: advanced technology attachment (ATA) (e.g., serial-ATA (SATA), and parallel-ATA (PATA)), Fibre Channel, small computer system interface (SCSI), serially attached SCSI (SAS), peripheral component interconnect (PCI), PCI-express, Non-Volatile Memory Express (NVMe), or the like. The electrical connection of interface 14 (e.g., the data bus, the control bus, or both) is electrically connected to controller 8, providing electrical connection between host device 4 and controller 8, allowing data to be exchanged between host device 4 and controller 8. In some examples, the electrical connection of interface 14 may also permit storage device 6 to receive power from host device 4.

Storage device 6 includes NVMA 10, which includes a plurality of memory devices 16Aa-16Nn (collectively, "memory devices 16"). Each of memory devices 16 may be configured to store and/or retrieve data. For instance, a memory device of memory devices 16 may receive data and a message from controller 8 that instructs the memory device to store the data. Similarly, the memory device of memory devices 16 may receive a message from controller 8 that instructs the memory device to retrieve data. In some examples, each of memory devices 16 may be referred to as a die. In some examples, a single physical chip may include a plurality of dies (i.e., a plurality of memory devices 16). In some examples, each of memory devices 16 may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, memory devices 16 may include any type of non-volatile memory devices. Some examples of memory devices 16 include, but are not limited to, flash memory devices (e.g., NAND or NOR), phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

In some examples, memory devices 16 may include flash memory devices. Flash memory devices may include NAND or NOR based flash memory devices, and may store data based on a charge contained in a floating gate of a transistor for each flash memory cell. In NAND flash memory devices, the flash memory device may be divided into a plurality of blocks, each of which may be divided into a plurality of pages. Each page of the plurality of pages within a particular memory device may include a plurality of NAND cells. Rows of NAND cells may be electrically connected using a word line to define a page of a plurality of pages. Respective cells in each of the plurality of pages may be electrically connected to respective bit lines. In some examples, controller 8 may write data to and read data from NAND flash memory devices at the page level and erase data from NAND flash memory devices at the block level. Additional details of memory devices 16 are discussed below with reference to FIG. 2.

Figure 2:
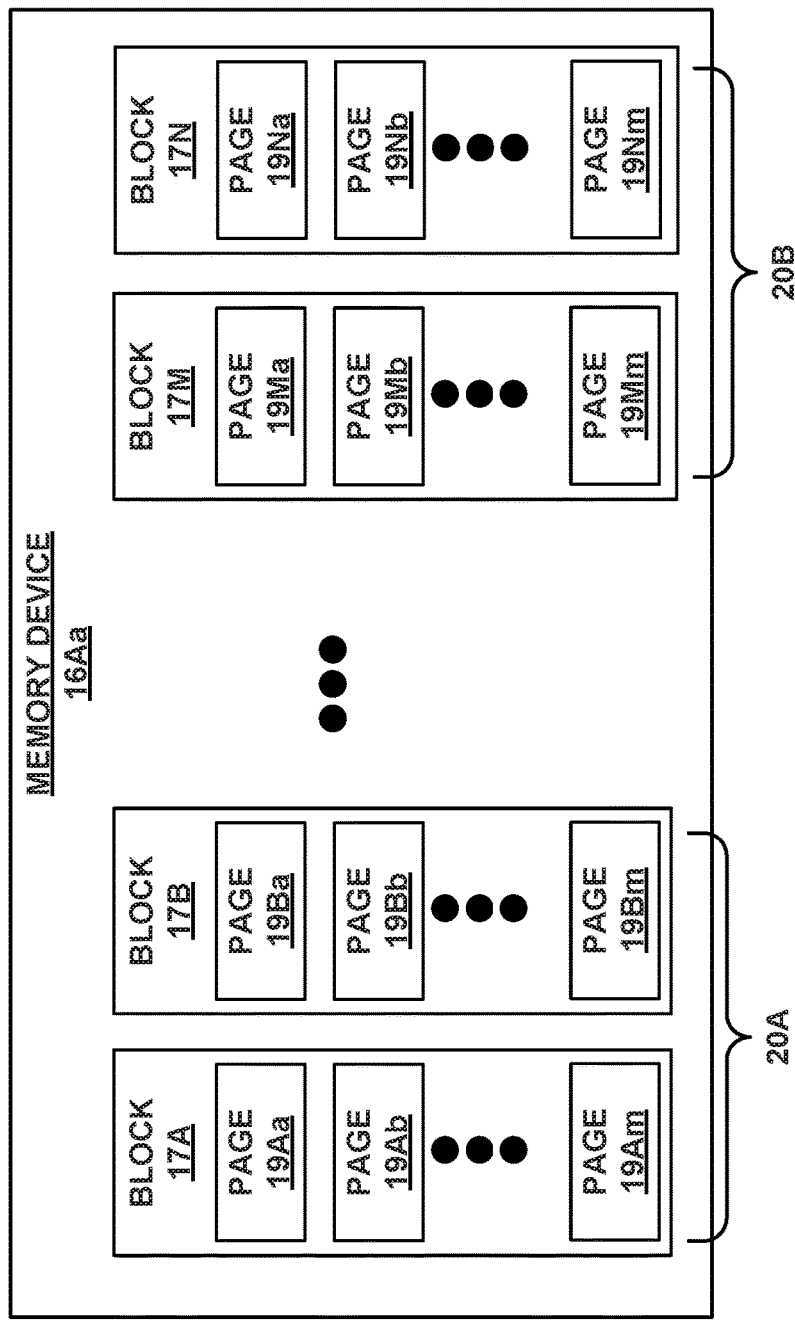
FIG. 2 is a conceptual block diagram illustrating an example memory device in a storage device, in accordance with one or more techniques of this disclosure.

FIG. 2 is a conceptual block diagram illustrating an example memory device 16Aa that includes a plurality of blocks 17A-17N (collectively, "blocks 17"), each block including a plurality of pages 19 Aa-19Nm (collectively, "pages 19"). Each block of blocks 17 may include a plurality of NAND cells. Rows of NAND cells may be serially electrically connected using a word line to define a page (one page of pages 19). Respective cells in each of a plurality of pages 19 may be electrically connected to respective bit lines. Controller 8 may write data to and read data from NAND flash memory devices at the page level and erase data from NAND flash memory devices at the block level. A group of two or more blocks may be referred to a logical block address collection. For example, logical block address collection 20A may include blocks 17A-17B and logical block address collection 20B may include blocks 17M-17N.

Returning to FIG. 1, in some examples, it may not be practical for controller 8 to be separately connected to each memory device of memory devices 16. As such, the connections between memory devices 16 and controller 8 may be multiplexed. As an example, memory devices 16 may be grouped into channels 18A-18N (collectively, "channels 18"). For instance, as illustrated in FIG. 1, memory devices 16Aa-16An may be grouped into first channel 18A, and memory devices 16Na-16Nn may be grouped into $N^{th}$ channel 18N. The memory devices 16 grouped into each of channels 18 may share one or more connections to controller 8. For instance, memory devices 16 grouped into first channel 18A may be attached to a common I/O bus and a common control bus. Storage device 6 may include a common I/O bus and a common control bus for each respective channel of channels 18. In some examples, each channel of channels 18 may include a set of chip enable (CE) lines which may be used to multiplex memory devices on each channel. For example, each CE line may be connected to a respective memory device of memory devices 18. In this way, the number of separate connections between controller 8 and memory devices 18 may be reduced. Additionally, as each channel has an independent set of connections to controller 8, the reduction in connections may not significantly affect the data throughput rate as controller 8 may simultaneously issue different commands to each channel.

Storage device 6 may include power supply 11, which may provide power to one or more components of storage device 6. When operating in a standard mode, power supply 11 may provide power to the one or more components using power provided by an external device, such as host device 4. For instance, power supply 11 may provide power to the one or more components using power received from host device 4 via interface 14. In some examples, power supply 11 may include one or more power storage components configured to provide power to the one or more components when operating in a shutdown mode, such as where power ceases to be received from the external device. In this way, power supply 11 may function as an onboard backup power source. Some examples of the one or more power storage components include, but are not limited to, capacitors, super capacitors, batteries, and the like.

Storage device 6 also may include volatile memory 12, which may be used by controller 8 to store information. In some examples, controller 8 may use volatile memory 12 as a cache. For instance, controller 8 may store cached information in volatile memory 12 until the cached information is written to memory devices 16. Volatile memory 12 may consume power received from power supply 11. Examples of volatile memory 12 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like)).

Storage device 6 includes controller 8, which may manage one or more operations of storage device 6. For example, controller 8 may manage the reading of data from and/or the writing of data to memory devices 16. Controller 8 may interface with host device 4 via interface 14 and manage the storage of data to and the retrieval of data from non-volatile memory 12 and memory devices 16. Controller 8 may, as one example, manage writes to and reads from memory devices 16 and non-volatile memory 12. In some examples, controller 8 may be a hardware controller. In other examples, controller 8 may be implemented into data storage device 6 as a software controller.

In accordance with techniques of this disclosure, during a BGMS process, controller 8 may scan a first page of a first block of a set of blocks in a memory device (e.g., memory device 16Aa) to determine whether to perform maintenance on the first page. As outlined above, memory device 16Aa includes a plurality of blocks. The plurality of blocks includes the set of blocks, with each respective block of the set of blocks including a plurality of pages. In some examples, the set of blocks may consist of only all of the blocks in a single plane of memory device 16Aa, or some amount of blocks less than the entirety of memory device 16Aa. In other examples, the set of blocks may include all of the blocks in memory device 16Aa, or all of the blocks in NVMA 10.

Each page in a block may include or be associated an index value. For example, each respective block may include 256 pages, and the index value may run from 0 to 255. For instance, in the first block of the set of blocks, controller 8 may scan a first page with an index of 0 to begin the BGMS process in order to determine whether to perform maintenance on that first page.

Throughout the scanning process, if controller 8 determines that maintenance should be performed on a particular page, controller 8 may proceed to perform maintenance on the particular page. In doing so, controller 8 may retrieve the data stored at the particular page for which maintenance is to be performed. Controller 8 may then locate a recovery page. The recovery page may be a different page at which no valid data is stored, either within the same block as the particular page from which the data is retrieved or in a different block than the block containing the particular page from which the data is retrieved. For example, controller 8 may retrieve the data stored at a particular page (e.g., page 19Aa), and then locate a recovery page (e.g., any one of pages 19Ab-19Am, 19Ba-19Bm, . . . , 19Na-19Nm, where no valid data is stored), and write the retrieved data to the recovery page (e.g., any one of pages 19Ab-19Am, 19Ba-19Bm, . . . , 19Na-19Nm, where no valid data is stored).

For each respective remaining block of the set of blocks, controller 8 may scan a respective first page of the respective remaining block to determine whether to perform maintenance on the respective first page. The first page of each of the respective remaining blocks may have the same first index value as the first page of the first block. In other words, rather than scanning each page of the first block all at once during the BGMS process (prior to scanning any pages of another block), controller 8 may scan each respective page with an index value equal to 0 for every remaining block in in the set of blocks (e.g., in memory device 16Aa or in a plane of memory device 16Aa) before scanning a second page in the first block.

After controller 8 has scanned a respective page with the first index value for each block in the set of blocks, controller 8 may scan a second page of the first block to determine whether to perform maintenance on the second page. For instance, after scanning the first page in each block, controller 8 may return to the first block to continue the BGMS process and scan a second page with an index value equal to 1 for the first block to determine whether to perform maintenance on that second page.

For each respective remaining block of the set of blocks, controller 8 may scan a respective second page of the respective remaining block to determine whether to perform maintenance on the respective second page. The second page of the first block may have a same second index value as the respective second pages of each of the respective remaining blocks. In other words, rather than scanning the remainder of the pages in the first block all at once during the BGMS process, controller 8 may continue the BGMS process by scanning the page with an index equal to 1 for every remaining block in memory device 16Aa before returning again to the first block to scan a subsequent page. In this manner, rather than performing the BGMS process at a block level for every block in memory device 16Aa, controller 8 performs the BGMS process at a page level and cycles through each block, scanning only a single page in each block of the set of blocks during each iteration of the process. This iterative technique enables the scanning of a block to be amortized over the planned scanning period, so that the block may be visited multiple times during the planned scanning period. By amortizing the workload in such a way, the potential read performance decrease due to die-collision may be reduced and the chance of detecting an on-going degradation on a particular block is increased, meaning that the storage device may more reliably store the data for an extended period of time.

Figure 3:
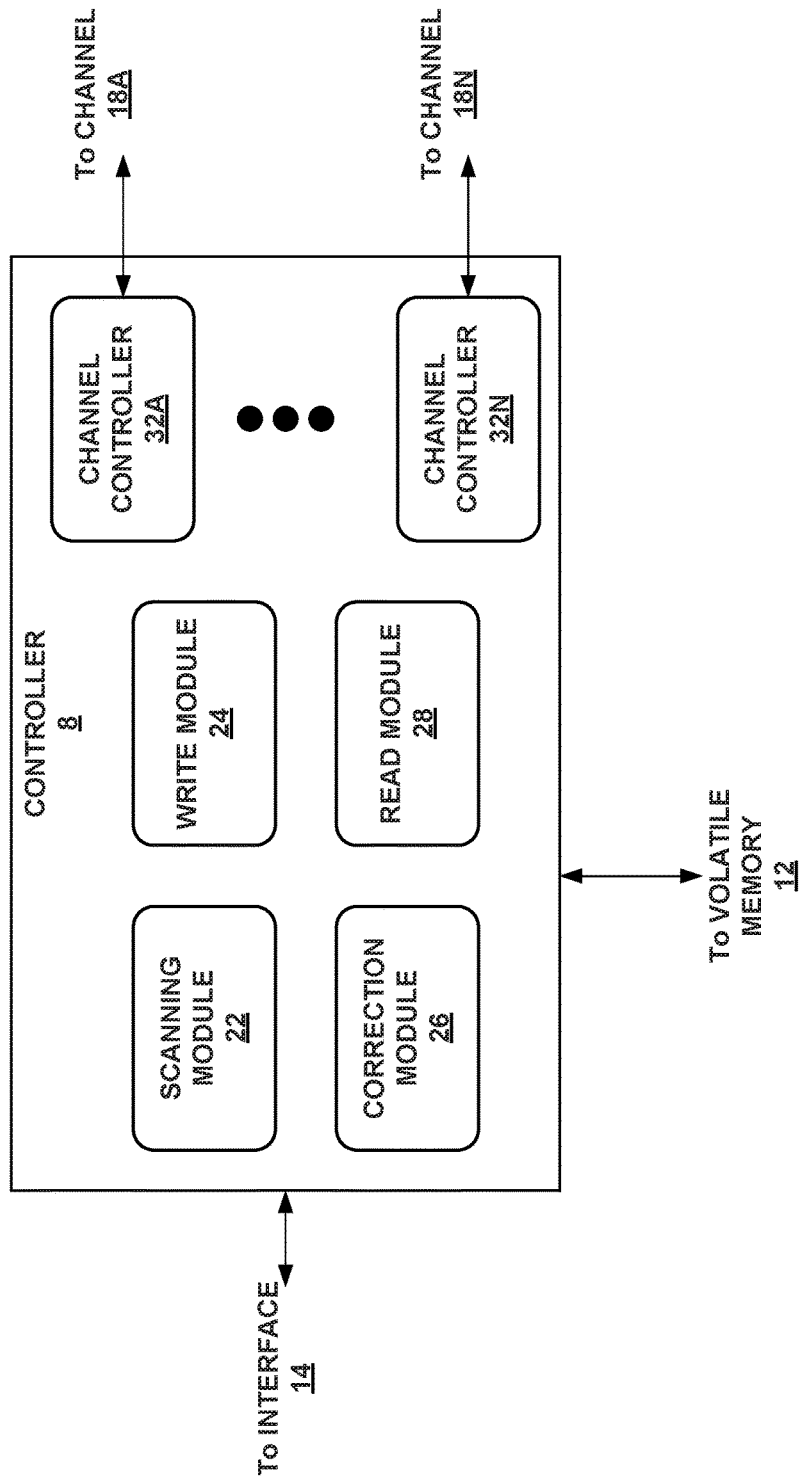
FIG. 3 is a conceptual and schematic block diagram illustrating an example controller configured to perform an incremental BGMS, in accordance with one or more techniques of this disclosure.

FIG. 3 is a conceptual and schematic block diagram illustrating an example controller 8 configured to perform an incremental BGMS in accordance with one or more techniques of this disclosure. In some examples, controller 8 may include scanning module 22, write module 24, correction module 26, read module 28, and a plurality of channel controllers 32A-32N (collectively, "channel controllers 32"). In other examples, controller 8 may include additional modules or hardware units, or may include fewer modules or hardware units. Controller 8 may include one or more microprocessors, digital signal processors (DSP), application specific integrated circuits (ASIC), field programmable gate arrays (FPGA), or other digital logic circuitry.

Controller 8 may interface with the host device 4 via interface 14 and manage the storage of data to and the retrieval of data from memory devices 16. For example, write module 24 of controller 8 may manage writes to memory devices 16. For example, write module 24 may receive a message from host device 4 via interface 14 instructing storage device 6 to store data associated with a logical address and the data, which may be referred to as user data. Write module 24 may manage writing of the user data to memory devices 16.

For example, write module 24 may manage translation between logical addresses used by host device 4 to manage storage locations of data and physical block addresses used by write module 24 to direct writing of data to memory devices. Write module 24 of controller 8 may utilize a flash translation layer or indirection table that translates logical addresses (or logical block addresses) of data stored by memory devices 16 to physical block addresses of data stored by memory devices 16. For example, host device 4 may utilize the logical block addresses of the data stored by memory devices 16 in instructions or messages to storage device 6, while write module 24 utilizes physical block addresses of the data to control writing of data to memory devices 16. (Similarly, read module 28 may utilize physical block addresses to control reading of data from memory devices 16.) The physical block addresses correspond to actual, physical blocks of memory devices 16. In some examples, write module 24 may store the flash translation layer or table in volatile memory 12. Upon receiving the one or more physical block addresses, write module 24 may define and/or select one or more physical blocks, and communicate a message to channel controllers 32A-32N (collectively, "channel controllers 32"), which causes the channel controllers 32 to write the data to the physical blocks.

Write module 24 may also rewrite data already saved to memory devices 16 when performing maintenance on pages in memory devices 16 during the BGMS process described in accordance with the techniques of this disclosure. For instance, if scanning module 22 determines that a page in a block on memory device 16Aa requires maintenance, write module 24 may write the data previously stored to that page to a different page, either within or outside of the original block.

Each channel controller of channel controllers 32 may be connected to a respective channel of channels 18. In some examples, controller 8 may include the same number of channel controllers 32 as the number of channels 18 of storage device 2. Channel controllers 32 may perform the intimate control of addressing, programming, erasing, and reading of memory devices 16 connected to respective channels, e.g., under control of write module 24 and/or read module 28.

In accordance with techniques of this disclosure, during a BGMS process, scanning module 22 of controller 8 may scan a first page of a first block of a set of blocks in a memory device (e.g., memory device 16Aa) to determine whether to perform maintenance on the first page. As outlined above, memory device 16Aa includes a plurality of blocks, and the plurality of blocks includes the set of blocks, with each respective block of the set of blocks including a plurality of pages. In some examples, the set of blocks may consist of only all of the blocks in a single plane of memory device 16Aa, or some amount of blocks less than the entirety of memory device 16Aa. In other examples, the set of blocks may include all of the blocks in memory device 16Aa, or all of the blocks in NVMA 10.

Each page in a block may include or be associated with an index value. For example, each respective block may include 512 pages, and the index value may run from 0 to 511. For instance, in the first block of the set of blocks, scanning module 22 may scan a first page with an index of 0 to begin the BGMS process in order to determine whether to perform maintenance on that first page. In general, scanning module 22 may select any page index value to begin the BGMS process.

For each respective remaining block of the set of blocks, scanning module 22 may scan a respective first page of the respective remaining block to determine whether to perform maintenance on the respective first page. The first page of each of the remaining blocks may have the same first index value as the first page of the first block. In other words, rather than scanning each page of the first block all at once during the BGMS process (prior to scanning any pages of another block), scanning module 22 may scan each respective page with an index value equal to 0 for every remaining block in in the set of blocks (e.g., in memory device 16Aa or in a plane of memory device 16Aa) before scanning a second page in the first block.

After scanning module 22 has scanned a respective page with the first index value for each block in the set of blocks, scanning module 22 may scan a second page of the first block to determine whether to perform maintenance on the second page. For instance, after scanning the first page in each block, scanning module 22 may return to the first block to continue the BGMS process and scan a second page with an index value equal to 511 for the first block to determine whether to perform maintenance on that second page.

In this manner, scanning module 22 may scan the various pages of memory device 16Aa (or the plane in memory device 16Aa) in a non-sequential manner. In other words, unlike the example of FIG. 1 where scanning module 22 incrementally, or sequentially, scans the pages (i.e., first scanning all pages with an index of 0, then scanning all pages with an index of 1, etc.) of the blocks in the set of blocks, scanning module 22 may scan the pages in a non-sequential manner. For instance, scanning module 22 may have some other pre-defined order (i.e., index 0, index 511, index 255, index 127, etc.) or some other random or pseudo-random order. Generally, scanning module 22 may scan the pages in any index order, and may scan the pages at each available index prior to repeating a scan for any particular page (i.e., scanning module 22 may scan the pages at each available index prior to scanning the pages at index 0 for a second time).

For each respective remaining block of the set of blocks, scanning module 22 may scan a respective second page of the respective remaining block to determine whether to perform maintenance on the respective second page. The second page of the first block may have a same second index value as the respective second page. In other words, rather than scanning the remainder of the pages in the first block all at once during the BGMS process, scanning module 22 may continue the BGMS process by scanning the page with an index equal to 511 for every remaining block in memory device 16Aa (or a plane of memory device 16Aa) before returning again to the first block to scan a subsequent page. In this manner, rather than performing the BGMS process at a block level for every block in memory device 16Aa, scanning module 22 performs the BGMS process at a page level and cycles through each block, scanning only a single page during each iteration of the process.

Throughout the scanning process, if scanning module 22 determines that maintenance should be performed on a particular page, correction module 26 may perform maintenance on the particular page. In doing so, correction module 26 may cause read module 28 to retrieve the data stored at the particular page at which maintenance is to be performed. Correction module 26 may then locate a recovery page, or a different page at which no valid data is stored, either within the same block as the particular page or in a different block than the block containing the particular page, and utilize write module 24 to write the retrieved data to the recovery page.

For instance, scanning module 22 may determine that a page with an index of 34 in the first block may require maintenance. In response to this determination, scanning module 22 may communicate an instruction to correction module, and, in response to the instruction, correction module 26 may cause read module 28 to retrieve the data stored at the page with the index of 34 in the first block. In some examples, causing read module 28 to retrieve the data stored at the page may include decoding the data (should the data be encoded), decrypting the data (should the data be encrypted), decompressing the data (should the data be compressed), performing error correction to recover any errors in the data, or the like. These techniques and any other techniques associated with reading of data may be performed by read module 28, correction module 26, or other modules not shown in FIG. 2 (e.g., an ECC module, an encryption/decryption module, a compression module, or the like). Correction module 26 may determine that a page with an index of 62 in the first block does not contain any valid data, after which correction module 26 may cause write module 24 to write the retrieved data to this new location. In some examples, causing write module 24 to write the data to a new location may include encoding the data, encrypting the data, compressing the data, determining error correction data to allow recovery of errors accumulated in the data during storage, or the like. These techniques and any other techniques associated with writing of data may be performed by write module 24, correction module 26, or other modules not shown in FIG. 2 (e.g., an ECC module, an encryption/decryption module, a compression module, or the like).

In some examples, scanning module 22 and correction module 26 may perform the above scanning and maintenance process in the background substantially continuously (e.g., continuously or nearly continuously) while other processes are performed by controller 8 (e.g., by other modules of controller 8). In other examples, scanning module 22 and correction module 26 may perform the BGMS process during times at which other modules of controller 8 are idle. For instance, controller 8 may receive an instruction from host device 4 to perform a specific instruction, such as retrieve data stored in memory device 16Aa that is associated with a program being executed by host device 4. While controller 8 is performing the operation, scanning module 22 may refrain from scanning any pages in the set of blocks. Further, in some examples, while controller 8 is performing the operation, scanning module 22 may record an amount of time controller 8 spends performing the operation. Once controller 8 completes performance of the operation, scanning module 22 may scan a number of pages successively based on the amount of time controller 8 spent performing the received operation.

For instance, during idle times, scanning module 22 may scan a first page, wait for a predetermined time delay, and then scan a second page. In some instances, the predetermined time delay may be as large as 200 milliseconds (ms). In other instances, the predetermined time delay may be less than 10 ms. Once controller 8 receives instructions to perform a particular operation, scanning module 22 may refrain from scanning any additional pages. Scanning module 22 may then begin a "debt collection" process in which scanning module 22 determines how many pages could have been scanned during the time controller 8 was performing the operation. For instance, if the operation takes 40 ms for controller 8 to perform, and the predetermined time delay is equal to 4 ms, scanning module 22 may determine that 10 pages could have been scanned in the time controller 8 was performing the operation. As such, once controller 8 completes performance of the operation, scanning module 22 may scan 10 pages (e.g., a page with an index of 0 for the first ten blocks of memory device 16Aa or in a plane of memory device 16Aa) without any time delay between scans (or with a much smaller delay than the typical predetermined time delay). Once the 10 pages are scanned successively in such a manner, scanning module 22 may continue with the normal process, i.e., scanning a next page in the scanning order, waiting for the predetermined time delay, and then scanning another next page in the scanning order. Although this timing example is described as scanning single pages either in succession or with the predetermined time delay in between, scanning module 22 may instead scan groups of pages in each scanning instance.

Figure 4:
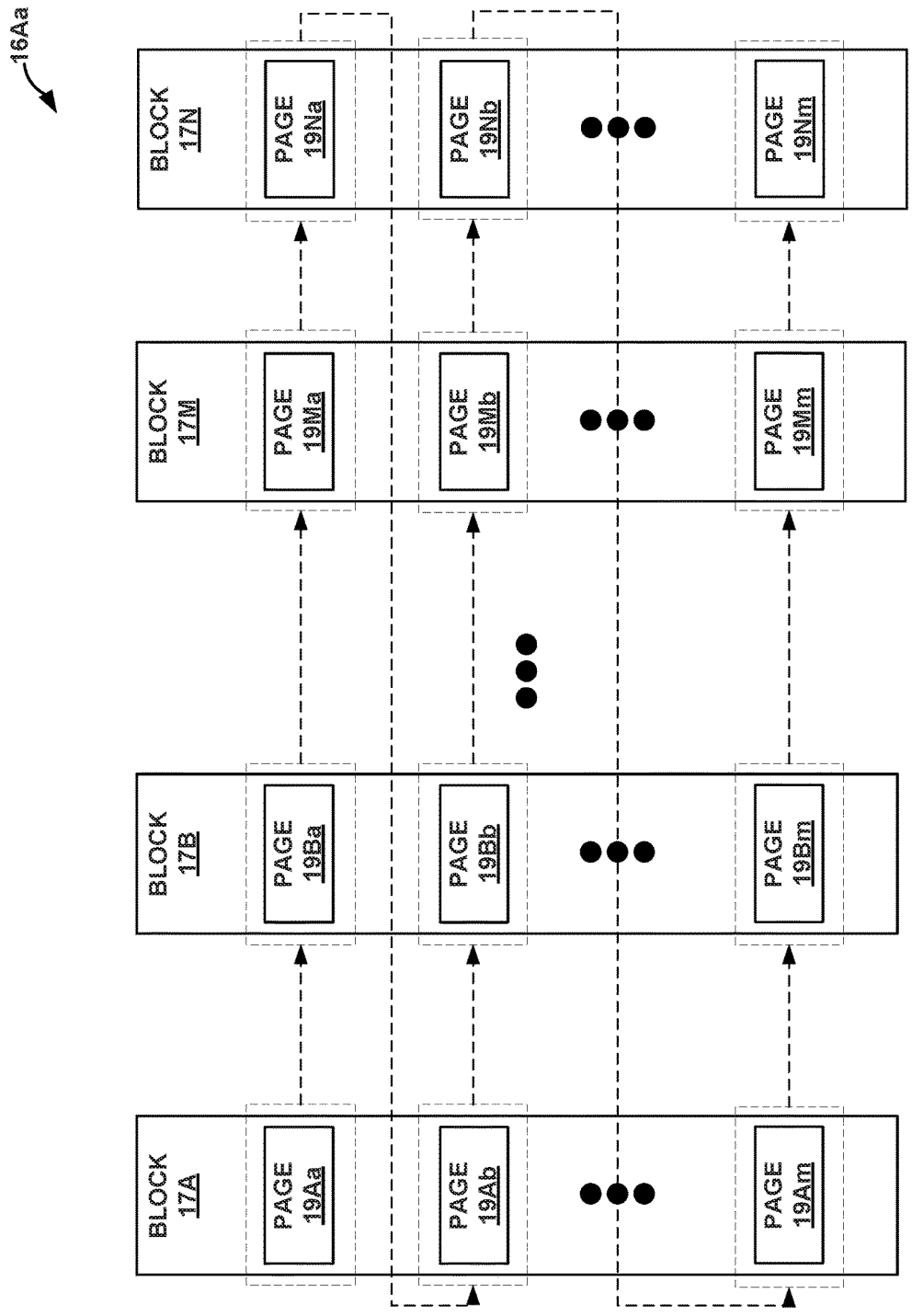
FIG. 4 is a conceptual and schematic block diagram illustrating example details of a memory device containing data blocks that are scanned by a controller, in accordance with one or more techniques of this disclosure.

FIG. 4 is a conceptual and schematic block diagram illustrating example details of a memory device containing data blocks that are scanned by a controller, in accordance with one or more techniques of this disclosure. For ease of illustration, the exemplary technique of FIG. 4 will be described with concurrent reference to data blocks 17A-17N (herein after "data blocks 17") of memory device 16Aa and controller 8 of FIGS. 1, 2, and 3. However, the techniques may be used with any combination of hardware or software.

As shown in FIG. 4, memory device 16Aa includes a set of data blocks 17A-17N (collectively "data blocks 17"). Further, each data block of data blocks 17 include multiple pages 19 of data. For the purposes of this disclosure, each page of pages 19 may or may not store valid data, and controller 8 may scan each page of pages 19 when performing the BGMS process, in accordance with the techniques described herein. In some instances, data blocks 17 may include all of the data blocks in memory device 16Aa. In other instances, data blocks 17 may include only the data blocks in a single plane of memory device 16Aa, or some other amount of data blocks less than all of the data blocks in memory device 16Aa.

In accordance with techniques of this disclosure, controller 8 may scan first page 19Aa of first data block 17A of data blocks 17 in memory device 16Aa to determine whether to perform maintenance on first page 19Aa. In some examples, first page 19Aa may be the first page in data block 17A, i.e., a page with an index of 0. In general, first page 19Aa may have any index value. If controller 8 determines that first page 19Aa requires maintenance, controller 8 may perform maintenance on first page 19Aa. Otherwise, controller 8 may continue scanning memory device 16Aa.

Rather than continuing to scan the remainder of data block 17A, controller 8 may instead scan first page 19Ba of data block 17B to determine whether to perform maintenance on first page 19Ba. First page 19Ba has the same index value as first page 19Aa of first data block 17A. If controller 8 determines that first page 19Ba requires maintenance, controller 8 may perform maintenance on first page 19Ba. Otherwise, controller 8 may continue scanning memory device 16Aa by scanning the first page of the remainder of data blocks 17, ultimately scanning first page 19Ma of data block 17M and first page 19Na of final data block 17N.

After scanning, and potentially performing maintenance, on first page 19Na of final data block 17N, controller 8 may return to data block 17A to scan second page 19Ab of data block 17A to determine whether to perform maintenance on second page 19Ab. Second page 19Ab, in the example of FIG. 4, may be the second page in data block 17A, i.e., a page with an index of 1. However, in other instances, second page 19Ab may be any other page in data block 17A and may merely be the second page in the scanning order. If controller 8 determines that second page 19Ab requires maintenance, controller 8 may perform maintenance on second page 19Ab. Otherwise, controller 8 may continue scanning memory device 16Aa.

Again, rather than continuing to scan the remainder of data block 17A, controller 8 may instead scan second page 19Bb of data block 17B to determine whether to perform maintenance on second page 19Bb. Second page 19Bb has the same index value as second page 19Ab of first data block 17A. If controller 8 determines that second page 19Bb requires maintenance, controller 8 may perform maintenance on second page 19Bb. Otherwise, controller 8 may continue scanning memory device 16Aa by scanning the second page of the remainder of data blocks 17, ultimately scanning second page 19Mb of data block 17M and second page 19Nb of final data block 17N.

The above process may repeat for the third page, fourth page, and so on until controller 8 reaches final page 19Am of data block 17A. Controller 8 may scan final page 19Am of data block 17A to determine whether to perform maintenance on final page 19Am. Final page 19Am, in the example of FIG. 4, may be the final page in data block 17A, e.g., a page with an index of 255 if data block 17A includes 256 total pages. However, in other instances, final page 19Am may be any other page in data block 17A and may merely be the final page in the scanning order. If controller 8 determines that final page 19Am requires maintenance, controller 8 may perform maintenance on final page 19Am. Otherwise, controller 8 may continue scanning memory device 16Aa.

Controller 8 may continue scanning the pages 19 in memory device 16Aa until reaching a final index value, which in the example of FIG. 4, is associated with final page 19Bm. Controller 8 may scan final page 19Bm of data block 17B to determine whether to perform maintenance on final page 19Bm. If controller 8 determines that final page 19Bm requires maintenance, controller 8 may perform maintenance on final page 19Bm. Otherwise, controller 8 may continue scanning memory device 16Aa by scanning the final page of the remainder of data blocks 17, ultimately scanning final page 19Mm of data block 17M and final page 19Nm of final data block 17N. At this point, in some examples, controller 8 may repeat the entire BGMS process again, beginning with first page 19Aa of data block 17A.

Figure 5:
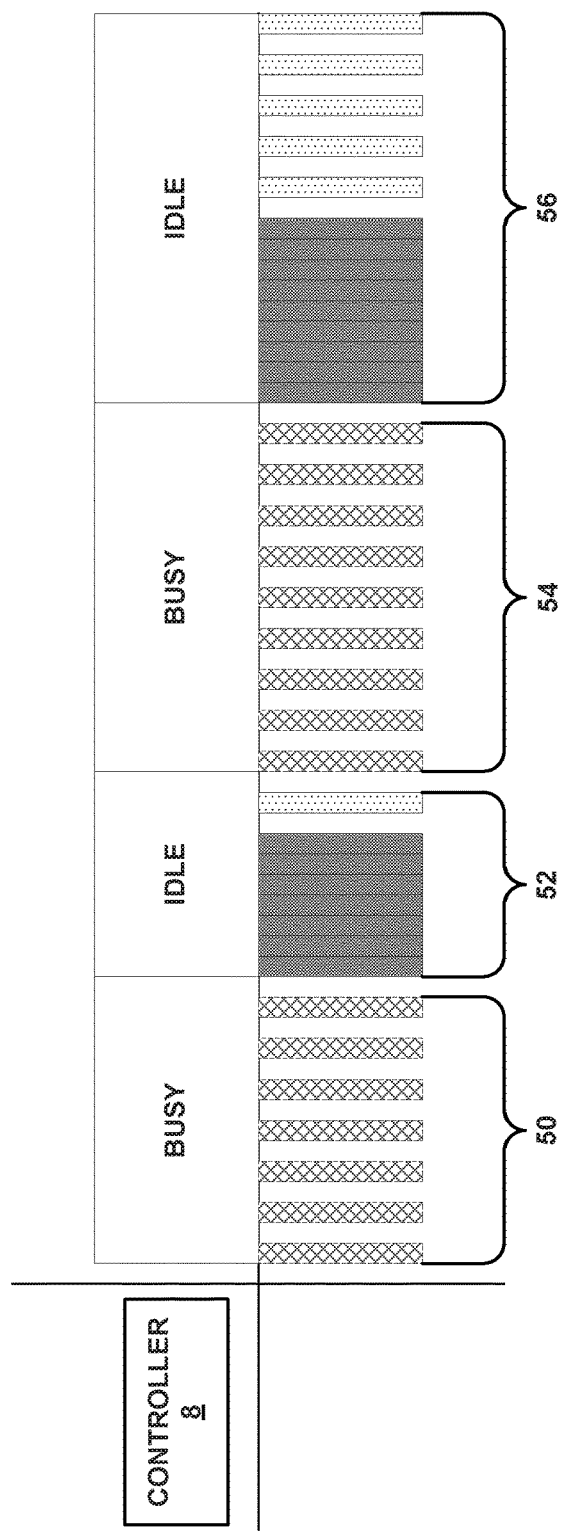
FIG. 5 is a conceptual timing diagram illustrating an example timing sequence of an incremental BGMS, in accordance with one or more techniques of this disclosure.

FIG. 5 is a conceptual timing diagram illustrating an example timing sequence of an incremental BGMS, in accordance with one or more techniques of this disclosure. For ease of illustration, the exemplary technique of FIG. 5 will be described with concurrent reference to data blocks 17A-17N (herein after "data blocks 17) of memory device 16Aa and controller 8 of FIGS. 1, 2, and 3. However, the techniques may be used with any combination of hardware or software.

In the example of FIG. 5, during idle times, controller 8 may perform the BGMS process described throughout this disclosure. In this example, during an idle time, controller 8 may scan a first page, wait for a predetermined time delay, and then scan a second page. In some instances, the predetermined time delay may be as large as 200 milliseconds (ms). In other instances, the predetermined time delay may be less than 10 ms. Once controller 8 receives instructions to perform a particular operation, controller 8 may refrain from scanning any additional pages. Controller 8 may then begin a "debt collection" process in which controller 8 determines how many pages could have been scanned during the time controller 8 was performing the operation.

For instance, in the example of FIG. 5, each bar with a crosshatched pattern may be an instance of a page that controller 8 could have performed a BGMS scan in accordance with the techniques of this disclosure if not for controller 8 being busy performing other operations. During busy time 50, controller 8 may determine that 7 pages may have been scanned if not for controller 8 performing an operation received from host device 4. As such, once controller 8 completes the operation at the end of busy time 50 and begins idle time 52, controller 8 may scan the next 7 pages successively, i.e., controller 8 may disregard the predetermined time delay and scan the 7 pages missed during busy time 50 without any time delay or with a time delay less than the typical predetermined time delay. In the example of FIG. 5, each bar with the dense dotted pattern may be a page that is scanned "successively" in this manner.

Once controller 8 scans the missed pages successively, controller 8 may revert to the normal idle time scan in which controller 8 refrains from scanning a page during the predetermined time delay and then scans a next page in the scanning order. In the example of FIG. 5, each bar with the sparse dotted pattern may be a page that is scanned in the normal flow of idle time scanning. In the example of FIG. 5, during idle time 52, controller 8 is able to scan one such page prior to receiving an additional instruction to perform an additional operation, leading to busy time 54.

During busy time 54, controller 8 may determine that 9 pages could have been scanned if not for controller 8 performing an operation received from host device 4. As such, once controller 8 completes the operation at the end of busy time 54 and begins idle time 56, controller 8 may scan the next 9 pages successively, i.e., controller 8 may disregard the predetermined time delay and scan the 9 pages missed during busy time 54 without any time delay or with a time delay less than the typical predetermined time delay. Once controller 8 scans the missed pages successively, controller 8 may revert to the normal idle time scan in which controller 8 refrains from scanning a page during the predetermined time delay and then scans a next page in the scanning order. In the example of FIG. 5, controller 8 may scan at least the next 5 pages in the scanning order in such a manner during idle time 56. Although this timing example is described as scanning single pages either in succession or with the predetermined time delay in between, scanning module 22 may instead scan groups of pages during each bar of FIG. 5.

Figure 6:
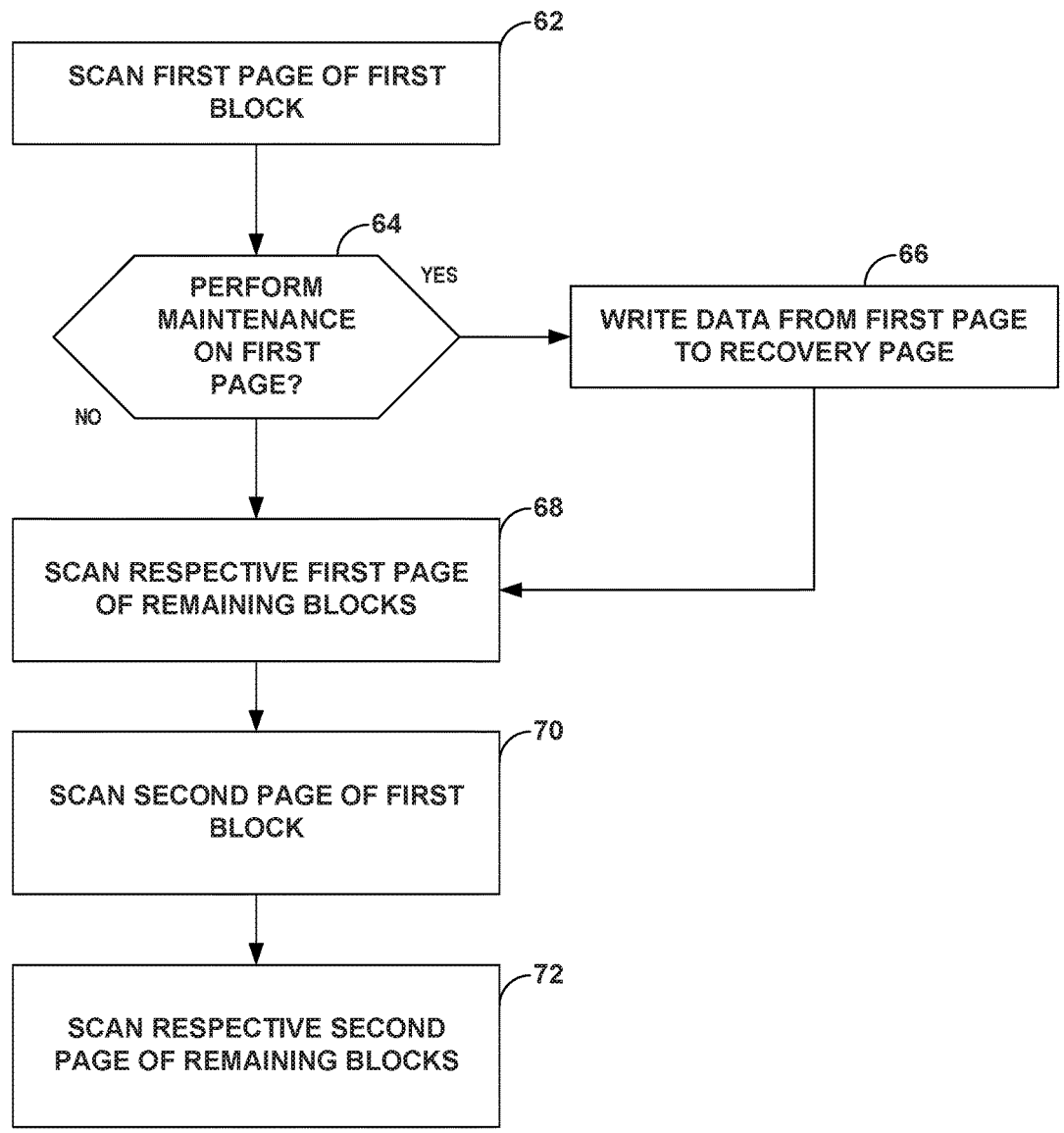
FIG. 6 is a flow diagram illustrating example incremental BGMS operations performed by a controller of a storage device, in accordance with one or more techniques of this disclosure.

FIG. 6 is a flow diagram illustrating example incremental BGMS operations performed by a controller of a storage device, in accordance with one or more techniques of this disclosure. For ease of illustration, the exemplary technique of FIG. 6 will be described with concurrent reference to storage device 6 and controller 8 of FIGS. 1 and 3. However, the techniques may be used with any combination of hardware or software.

In accordance with techniques of this disclosure, during a BGMS process, controller 8 may scan a first page of a first block of a set of blocks in a memory device (62) (e.g., memory device 16Aa) to determine whether to perform maintenance on the first page (64). As outlined above, memory device 16Aa includes a plurality of blocks and the plurality of blocks includes the set of blocks, with each respective block of the set of blocks including a plurality of pages. In some examples, the set of blocks may consist of only all of the blocks in a single plane of memory device 16Aa, or some amount of blocks less than the entirety of memory device 16Aa. In other examples, the set of blocks may include all of the blocks in memory device 16Aa, or all of the blocks in NVMA 10.

Each page in a block may include or be associated with an index value. For example, each respective block may include 1024 pages, and the index value may run from 0 to 1023. For instance, in the first block of the set of blocks, controller 8 may scan a first page with an index of 0 (or any other index value) to begin the BGMS process in order to determine whether to perform maintenance on that first page.

Throughout the scanning process, if controller 8 determines that maintenance should be performed on a particular page, controller 8 may proceed to perform maintenance on the particular page. For instance, in the example of FIG. 6, if controller 8 determines that maintenance should be performed on the first page (YES branch of 64), controller 8 may perform maintenance on the first page. In doing so, controller 8 may retrieve the data stored at the particular page at which maintenance must be performed. Controller 8 may then locate a recovery page. The recovery page may be a different page at which no valid data is stored, either within the same block as the particular page from which the data is retrieved or in a different block than the block containing the particular page from which the data is retrieved. For example, controller 8 may retrieve the data stored at a particular page (e.g., page 19Aa), and then locate a recovery page (e.g., any one of pages 19Ab-19Am, 19Ba-19Bm, . . . , 19Na-19Nm, where no valid data is stored), and write the retrieved data to the recovery page (e.g., any one of pages 19Ab-19Am, 19Ba-19Bm, . . . , 19Na-19Nm, where no valid data is stored) (66). As described above, in some examples, controller 8 may perform additional operations on the data, e.g., decryption/encryption, decompression/compression, decoding/encoding, error correction, or the like, as part of the maintenance.

For each respective remaining block of the set of blocks, controller 8 may scan a respective first page of the respective remaining block to determine whether to perform maintenance on the respective first page (68). The first page of each of the remaining blocks may have the same first index value as the first page of the first block. In other words, rather than scanning each page of the first block all at once during the BGMS process (prior to scanning any pages of another block), controller 8 may scan each respective page with the same index value (e.g., an index value equal to 0) for every remaining block in in the set of blocks (e.g., in memory device 16Aa or in a plane of memory device 16Aa) before scanning a second page in the first block.

After controller 8 has scanned a respective page with the first index value for each block in the set of blocks, controller 8 may scan a second page of the first block to determine whether to perform maintenance on the second page (70). The second page is associated with a second index value different than the first index value. For instance, after scanning the first page in each block, controller 8 may return to the first block to continue the BGMS process and scan a second page with an index value equal to 1 for the first block to determine whether to perform maintenance on that second page.

For each respective remaining block of the set of blocks, controller 8 may scan a respective second page of the respective remaining block to determine whether to perform maintenance on the respective second page (72). The second page of the first block may have a same second index value as the respective second page for each of the remaining blocks. In other words, rather than scanning the remainder of the pages in the first block all at once during the BGMS process, controller 8 may continue the BGMS process by scanning the page with the same index value (e.g., an index equal to 1) for every remaining block in memory device 16Aa (or a plane of memory device 16Aa) before returning again to the first block to scan a subsequent page. In this manner, rather than performing the BGMS process at a block level for every block in memory device 16Aa, controller 8 performs the BGMS process at a page level and cycles through each block, scanning only a single page during each iteration of the process.

For instance, controller 8 may determine that a page with an index of 254 in the final block may require maintenance. In response to this determination, controller 8 may retrieve the data stored at the page with the index of 254 in the final block. Controller 8 may determine that a page with an index of 62 in the first block does not contain any valid data, after which controller 8 may write the retrieved data to this new location.

In some examples, controller 8 may perform the above scanning and maintenance process in the background continuously while other processes are performed by controller 8. In other examples, controller 8 may perform the BGMS process during idle times. For instance, controller 8 may receive an instruction from host device 4 to perform a specific instruction, such as relocate data stored in memory device 16Aa. While controller 8 is performing the operation, controller 8 may refrain from scanning any pages in the set of blocks. Further, while controller 8 is performing the operation, controller 8 may record an amount of time controller 8 spends performing the received operation. Once controller 8 completes performance of the operation, controller 8 may scan a number of pages successively based on the amount of time controller 8 spent performing the received operation. Once controller 8 scans these missed pages successively in such a manner, controller 8 may continue with the normal BGMS process, i.e., scanning a next page in the scanning order, waiting for the predetermined time delay, and then scanning another next page in the scanning order.

In this way, by amortizing the scanning workload, the potential read performance decrease due to die-collision (i.e., the controller attempting to scan one block of data while simultaneously reading data from or writing data to the same block of data) may be reduced. Further, since the controller scans each block multiple times during the BGMS period, the chance of detecting on-going degradation on a particular block is increased, meaning that the storage device may more reliably store the data for an extended period of time.

Example 1

A method comprising: scanning, by a controller, a first page of a first block of a set of blocks in a storage device to determine whether to perform maintenance on the first page, wherein the storage device comprises a plurality of blocks and the plurality of blocks includes the set of blocks, and wherein each respective block of the set of blocks comprises a plurality of pages; in response to determining to perform maintenance on the first page of the first block, writing, by the controller, data previously stored in the first page of the first block to a recovery page, wherein the recovery page comprises a page in a block in the set of blocks different than the first page; for each respective remaining block of the set of blocks, scanning, by the controller, a respective first page of the respective remaining block to determine whether to perform maintenance on the respective first page, wherein the first page of the first block has a same first index value as the respective first page; scanning, by the controller, a second page of the first block to determine whether to perform maintenance on the second page; and for each respective remaining block of the set of blocks, scanning, by the controller, a respective second page of the respective remaining block to determine whether to perform maintenance on the respective second page, wherein the second page of the first block has a same second index value as the respective second page.

Example 2

The method of example 1, wherein the first index value indicates a relative location of the first page within the first block, wherein the first page of the first block having the same first index value as the respective first page comprises the first page of the first block having the same relative location within the first block as a relative location of the respective first page within the respective remaining block.

Example 3

The method of example 2, wherein the first index value and the second index value are sequential index values for each block in the set of blocks.

Example 4

The method of example 2, wherein the first index value and the second index value are non-sequential index values for each block in the set of blocks.

Example 5

The method of any of examples 1-4, further comprising: receiving, by the controller and from a host device, an instruction to perform an operation; performing, by the controller, the operation indicated by the instruction; while performing the operation: refraining, by the controller, from scanning any pages in the set of blocks; and recording, by the controller, an amount of time spent performing the operation to completion; and after completing performance of the operation, scanning, by the controller and based on the amount of time spent performing the operation, a number of pages in the set of blocks successively.

Example 6

The method of example 5, further comprising: after scanning the number of pages in the set of blocks successively: scanning, by the controller, a first remaining page of the set of blocks; and after a predetermined time delay, scanning, by the controller, a second remaining page of the set of blocks.

Example 7

The method of any of examples 1-6, wherein the storage device comprises a solid state drive.

Example 8

A storage device comprising: a data storage portion comprising a plurality of blocks; and a controller configured to: scan a first page of a first block of a set of blocks in a storage device to determine whether to perform maintenance on the first page, wherein the plurality of blocks includes the set of blocks, and wherein each respective block of the set of blocks comprises a plurality of pages; in response to determining to perform maintenance on the first page of the first block, write data previously stored in the first page of the first block to a recovery page, wherein the recovery page comprises a page in a block in the set of blocks different than the first page; for each respective remaining block of the set of blocks, scan a respective first page of the respective remaining block to determine whether to perform maintenance on the respective first page, wherein the first page of the first block has a same first index value as the respective first page; scan a second page of the first block to determine whether to perform maintenance on the second page; and for each respective remaining block of the set of blocks, scan a respective second page of the respective remaining block to determine whether to perform maintenance on the respective second page, wherein the second page of the first block has a same second index value as the respective second page.

Example 9

The storage device of example 8, wherein the first index value indicates a relative location of the first page within the first block, wherein the first page of the first block having the same first index value as the respective first page comprises the first page of the first block having the same relative location within the first block as a relative location of the respective first page within the respective remaining block.

Example 10

The storage device of example 9, wherein the first index value and the second index value are sequential index values for each block in the set of blocks.

Example 11

The storage device of example 9, wherein the first index value and the second index value are non-sequential index values for each block in the set of blocks.

Example 12

The storage device of any of examples 8-11, wherein the controller is further configured to: receive, from a host device, an instruction to perform an operation; perform the operation indicated by the instruction; while performing the operation: refrain from scanning any pages in the set of blocks; and record an amount of time spent performing the operation to completion; and after completing performance of the operation, scan, based on the amount of time spent performing the operation, a number of pages in the set of blocks successively.

Example 13

The storage device of example 12, wherein the controller is further configured to: after scanning the number of pages in the set of blocks successively: scan a first remaining page of the set of blocks; and after a predetermined time delay, scan a second remaining page of the set of blocks.

Example 14

The storage device of any of examples 8-13, wherein the storage device comprises a solid state drive.

Example 15

A computer-readable storage medium storing instructions that, when executed, cause a controller of a storage device to: scan a first page of a first block of a set of blocks in the storage device to determine whether to perform maintenance on the first page, wherein the storage device comprises a plurality of blocks and the plurality of blocks includes the set of blocks, and wherein each respective block of the set of blocks comprises a plurality of pages; in response to determining to perform maintenance on the first page of the first block, write data previously stored in the first page of the first block to a recovery page, wherein the recovery page comprises a page in a block in the set of blocks different than the first page; for each respective remaining block of the set of blocks, scan a respective first page of the respective remaining block to determine whether to perform maintenance on the respective first page, wherein the first page of the first block has a same first index value as the respective first page; scan a second page of the first block to determine whether to perform maintenance on the second page; and for each respective remaining block of the set of blocks, scan a respective second page of the respective remaining block to determine whether to perform maintenance on the respective second page, wherein the second page of the first block has a same second index value as the respective second page.

Example 16

The computer-readable storage medium of example 15, wherein the first index value indicates a relative location of the first page within the first block, wherein the first page of the first block having the same first index value as the respective first page comprises the first page of the first block having the same relative location within the first block as a relative location of the respective first page within the respective remaining block.

Example 17

The computer-readable storage medium of example 16, wherein the first index value and the second index value are sequential index values for each block in the set of blocks.

Example 18

The computer-readable storage medium of example 16, wherein the first index value and the second index value are non-sequential index values for each block in the set of blocks.

Example 19

The computer-readable storage medium of any of examples 15-18, wherein the instructions further cause the controller to: receive, from a host device, an instruction to perform an operation; perform the operation indicated by the instruction; while performing the operation: refrain from scanning any pages in the set of blocks; and record an amount of time spent performing the operation to completion; and after completing performance of the operation, scan, based on the amount of time spent performing the operation, a number of pages in the set of blocks successively.

Example 20

The computer-readable storage medium of example 19, wherein the instructions further cause the controller to: after scanning the number of pages in the set of blocks successively: scan a first remaining page of the set of blocks; and after a predetermined time delay, scan a second remaining page of the set of blocks.

Example 21

A device comprising means for performing the method of any combination of examples 1-7.

Example 22

A computer-readable storage medium encoded with instructions that, when executed, cause at least one processor of a computing device to perform the method of any combination of examples 1-7.

Example 23

A device comprising at least one module operable by one or more processors to perform the method of any combination of examples 1-7.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples of the disclosure have been described. Any combination of the described systems, operations, or functions is contemplated. These and other examples are within the scope of the following claims.

The invention claimed is:
1. A method comprising:
scanning, by a controller, a first page of a first block of a set of blocks in a storage device to determine whether to perform maintenance on the first page, wherein the storage device comprises a plurality of blocks and the plurality of blocks includes the set of blocks, and wherein each respective block of the set of blocks comprises a plurality of pages;
in response to determining to perform maintenance on the first page of the first block, writing, by the controller, data previously stored in the first page of the first block to a recovery page, wherein the recovery page comprises a page in a block in the set of blocks different than the first page;
for each respective remaining block of the set of blocks, scanning, by the controller, a respective first page of the respective remaining block to determine whether to perform maintenance on the respective first page, wherein the first page of the first block has a same first index value as the respective first page;

scanning, by the controller, a second page of the first block to determine whether to perform maintenance on the second page; and for each respective remaining block of the set of blocks, scanning, by the controller, a respective second page of the respective remaining block to determine whether to perform maintenance on the respective second page, wherein the second page of the first block has a same second index value as the respective second page.

2. The method of claim 1, wherein the first index value indicates a relative location of the first page within the first block, wherein each respective first page of each remaining block have the same relative location within the respective remaining block as the relative location of the first page in the first block.

3. The method of claim 2, wherein the first index value and the second index value are sequential index values for each block in the set of blocks.

4. The method of claim 2, wherein the first index value and the second index value are non-sequential index values for each block in the set of blocks.

5. The method of claim 1, further comprising:
receiving, by the controller and from a host device, an instruction to perform an operation;
performing, by the controller, the operation indicated by the instruction;
while performing the operation:
refraining, by the controller, from scanning any pages in the set of blocks; and
recording, by the controller, an amount of time spent performing the operation to completion; and
after completing performance of the operation, scanning, by the controller and based on the amount of time spent performing the operation, a number of pages in the set of blocks successively.

6. The method of claim 5, further comprising:
after scanning the number of pages in the set of blocks successively:
scanning, by the controller, a first remaining page of the set of blocks; and
after a predetermined time delay, scanning, by the controller, a second remaining page of the set of blocks.

7. The method of claim 1, wherein the storage device comprises a solid state drive.

8. A storage device comprising:
a data storage portion comprising a plurality of blocks; and
a controller configured to:
scan a first page of a first block of a set of blocks in a storage device to determine whether to perform maintenance on the first page, wherein the plurality of blocks includes the set of blocks, and wherein each respective block of the set of blocks comprises a plurality of pages;
in response to determining to perform maintenance on the first page of the first block, write data previously stored in the first page of the first block to a recovery page, wherein the recovery page comprises a page in a block in the set of blocks different than the first page;
for each respective remaining block of the set of blocks, scan a respective first page of the respective remaining block to determine whether to perform maintenance on the respective first page, wherein the first page of the first block has a same first index value as the respective first page;
scan a second page of the first block to determine whether to perform maintenance on the second page; and
for each respective remaining block of the set of blocks, scan a respective second page of the respective remaining block to determine whether to perform maintenance on the respective second page, wherein the second page of the first block has a same second index value as the respective second page.

9. The storage device of claim 8, wherein the first index value indicates a relative location of the first page within the first block, wherein the first page of the first block having the same first index value as the respective first page comprises the first page of the first block having the same relative location within the first block as a relative location of the respective first page within the respective remaining block.

10. The storage device of claim 9, wherein the first index value and the second index value are sequential index values for each block in the set of blocks.

11. The storage device of claim 9, wherein the first index value and the second index value are non-sequential index values for each block in the set of blocks.

12. The storage device of claim 8, wherein the controller is further configured to:
receive, from a host device, an instruction to perform an operation;
perform the operation indicated by the instruction;
while performing the operation:
refrain from scanning any pages in the set of blocks; and
record an amount of time spent performing the operation to completion; and
after completing performance of the operation, scan, based on the amount of time spent performing the operation, a number of pages in the set of blocks successively.

13. The storage device of claim 12, wherein the controller is further configured to:
after scanning the number of pages in the set of blocks successively:
scan a first remaining page of the set of blocks; and
after a predetermined time delay, scan a second remaining page of the set of blocks.

14. The storage device of claim 8, wherein the storage device comprises a solid state drive.

15. A computer-readable storage medium storing instructions that, when executed, cause a controller of a storage device to:
scan a first page of a first block of a set of blocks in the storage device to determine whether to perform maintenance on the first page, wherein the storage device comprises a plurality of blocks and the plurality of blocks includes the set of blocks, and wherein each respective block of the set of blocks comprises a plurality of pages;
in response to determining to perform maintenance on the first page of the first block, write data previously stored in the first page of the first block to a recovery page, wherein the recovery page comprises a page in a block in the set of blocks different than the first page;
for each respective remaining block of the set of blocks, scan a respective first page of the respective remaining block to determine whether to perform maintenance on the respective first page, wherein the first page of the first block has a same first index value as the respective first page;

scan a second page of the first block to determine whether to perform maintenance on the second page; and for each respective remaining block of the set of blocks, scan a respective second page of the respective remaining block to determine whether to perform maintenance on the respective second page, wherein the second page of the first block has a same second index value as the respective second page.

16. The computer-readable storage medium of claim 15, wherein the first index value indicates a relative location of the first page within the first block, wherein the first page of the first block having the same first index value as the respective first page comprises the first page of the first block having the same relative location within the first block as a relative location of the respective first page within the respective remaining block.

17. The computer-readable storage medium of claim 16, wherein the first index value and the second index value are sequential index values for each block in the set of blocks.

18. The computer-readable storage medium of claim 16, wherein the first index value and the second index value are non-sequential index values for each block in the set of blocks.

19. The computer-readable storage medium of claim 15, wherein the instructions further cause the controller to:
receive, from a host device, an instruction to perform an operation;
perform the operation indicated by the instruction;
while performing the operation:
refrain from scanning any pages in the set of blocks; and
record an amount of time spent performing the operation to completion; and
after completing performance of the operation, scan, based on the amount of time spent performing the operation, a number of pages in the set of blocks successively.

20. The computer-readable storage medium of claim 19, wherein the instructions further cause the controller to:
after scanning the number of pages in the set of blocks successively:
scan a first remaining page of the set of blocks; and
after a predetermined time delay, scan a second remaining page of the set of blocks.

* * * * *